United States Patent
Schwaninger (10) Patent No.: US 8,978,029 B2
(45) Date of Patent: Mar. 10, 2015

(54) AUTOMATED TEMPLATE DEPLOYMENT TO COMPUTING PLATFORMS

(71) Applicant: Christian Schwaninger, Eppelheim (DE)

(72) Inventor: Christian Schwaninger, Eppelheim (DE)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 13/893,149

(22) Filed: May 13, 2013

(65) Prior Publication Data

US 2014/0337830 A1 Nov. 13, 2014

(51) Int. Cl.
*G06F 9/445* (2006.01)

(52) U.S. Cl.
CPC ........................................ *G06F 8/61* (2013.01)
USPC ............................ 717/177; 717/174; 717/176

(58) Field of Classification Search
None
See application file for complete search history.

(56) References Cited

U.S. PATENT DOCUMENTS

| | | | | |
|---|---|---|---|---|
| 8,108,855 | B2 * | 1/2012 | Dias et al. ...................... | 717/177 |
| 8,464,249 | B1 * | 6/2013 | Goldman et al. ............... | 717/176 |
| 8,713,135 | B1 * | 4/2014 | Adogla et al. ................. | 709/220 |
| 2008/0276234 | A1 * | 11/2008 | Taylor et al. ................... | 717/177 |
| 2008/0288939 | A1 * | 11/2008 | DeHaan ......................... | 717/177 |
| 2009/0144514 | A1 * | 6/2009 | Lamantia et al. .............. | 711/161 |
| 2010/0058328 | A1 * | 3/2010 | DeHaan ......................... | 717/176 |
| 2010/0107155 | A1 * | 4/2010 | Banerjee et al. ............... | 717/177 |
| 2010/0235828 | A1 * | 9/2010 | Nishimura et al. ............ | 717/174 |
| 2012/0246634 | A1 * | 9/2012 | Wright et al. .................. | 717/174 |
| 2012/0266170 | A1 * | 10/2012 | Zimmerman et al. ............ | 718/1 |
| 2013/0297922 | A1 * | 11/2013 | Friedman ........................... | 713/2 |

OTHER PUBLICATIONS

Hnetynka, "A model-driven environment for component deployment," 2005, Third ACIS International Conference on Software Engineering Research, Management and Applications, pp. 6-13.*
Pasala et al., "Selection of Regression Test Suite to Validate Software Applications upon Deployment of Upgrades," 2008, 19th Australian Conference on Software Engineering, ASWEC 2008, pp. 130-138.*
Huber et al., "Templates-instruments for standardizing ERP systems," 2000. Proceedings of the 33rd Annual Hawaii International Conference on System Sciences, pp. 1-10.*

* cited by examiner

*Primary Examiner* — Thuy Dao
*Assistant Examiner* — Stephen Berman
(74) *Attorney, Agent, or Firm* — Schwegman Lundberg & Woessner, P.A.

(57) ABSTRACT

Various embodiments include at least one of systems, methods, and software for automated deployment of a deployment template to computing systems. Some embodiments include receiving a selection of a deployment template from an entity via a network, identifying platforms of the entity compatible with the compatibility information, receiving a selection of a target platform, validating the selected deployment template for deployment to the selected platform, and deploying the selected deployment template to the selected platform. The validation of the selected deployment template for deployment to the selected platform may include transmitting a validation data request to an agent that executes on the selected platform to obtain validation data related to at least one validation rule, receiving validation data in response to the validation data request, and applying the at least one validation rule to the received validation data to determine validation success or failure.

12 Claims, 5 Drawing Sheets

AUTOMATED TEMPLATE DEPLOYMENT TO COMPUTING PLATFORMS

BACKGROUND INFORMATION

Deployment of an enterprise-class computing system, such as an Enterprise Resource Planning (ERP) or Customer Relationship Management (CRM) systems, can be a lengthy and expensive process. To try (i.e., trial) such systems when contemplating a purchase, the time and cost involved in creating and configuring a test instance are often prohibitive. Similar confounds also exist when an entity already using such a system is contemplating a system add-on.

DETAILED DESCRIPTION

Various embodiments herein include at least one of systems methods, and software for automated template deployment to computing platforms. A deployment template includes at least one of binaries, configuration data, application data, and other data that is preconfigured and available for deployment to a computing platform. A deployment template may be instantiated on a target computing platform as an entire software system. In other embodiments, a deployment template may be configuration data, application data, and other data of a portion of a larger software system. Application providers and requesters (e.g., users, customers) may utilize deployment templates for various purposes, such as to test or try a new application or a new portion thereof. Deployment templates are generally rapidly deployable, such as on-demand via a web-based marketplace.

Deployment templates may be deployed via a network, or by various out-of-band means, by a deployment template tool. The deployment template tool, in some embodiments, operates to automate the template deployment process. For example, a deployment template tool may operate to automatically deploy a deployment template such that a user may select, or otherwise specify only the deployment template to be deployed and the target computing platform to which the deployment template is to be deployed. After the initial selection, the deployment template tool may perform a process to automatically deploy the deployment template from a deployment template repository to the target computing platform. A length of this automatic process, in some embodiments, is measured in minutes, such as 30 minutes, and generally not more than a few hours, depending on network speed and latency.

Such deployment to date has been quite lengthy, often measured in weeks, months, or even years. Such deployments have been so lengthy due to system complexity, configurability, and a lack of automation. Further, units of deployable software have been larger and not modularized. For example, such a deployment effort has typically been performed as a series of manual tasks. For example, template providers have typically been restricted to shipping read-only installation media (e.g., CD, DVD) that is used to install an entire software system, thereafter requiring a complicated configuration process. Alternatively, a user may copy an existing software system to another hardware or virtual machine platform, and manually install and configure the software system. The various embodiments illustrated and described herein automate this process. Some such embodiments further simplify and accelerate this process by deploying deployment templates of entire software systems, or portions thereof, over a network, such as the Internet.

Some embodiments include a deployment template agent program installed on a computing platform. The computing platform may be a physical hardware system on which an operating system is present. However, in other embodiments, the computing platform on which the deployment template agent program is present may be a virtual machine that exists in a virtualized computing environment. Regardless, references to computing platforms herein are with regard to an operating platform on which an application executes, which may include one or more computing devices and virtual machines. References to applications are generally to software applications that execute on computing platforms and their associated binary, data, and configuration files.

In some embodiments, the deployment template agent program may respond to a request received via the network interface device by providing data representative of computing resources available within the computing platform. The deployment template agent program may receive a deployment template including at least one of binaries, configuration files, and data files of at least a portion of a computer program. The deployment template agent program may install the received deployment template on the computing platform. Additionally, the deployment template agent program may generate and transmit at least one message to a source of the received deployment template including installation progress information.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

These and other embodiments are described, with reference to the figures, herein. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
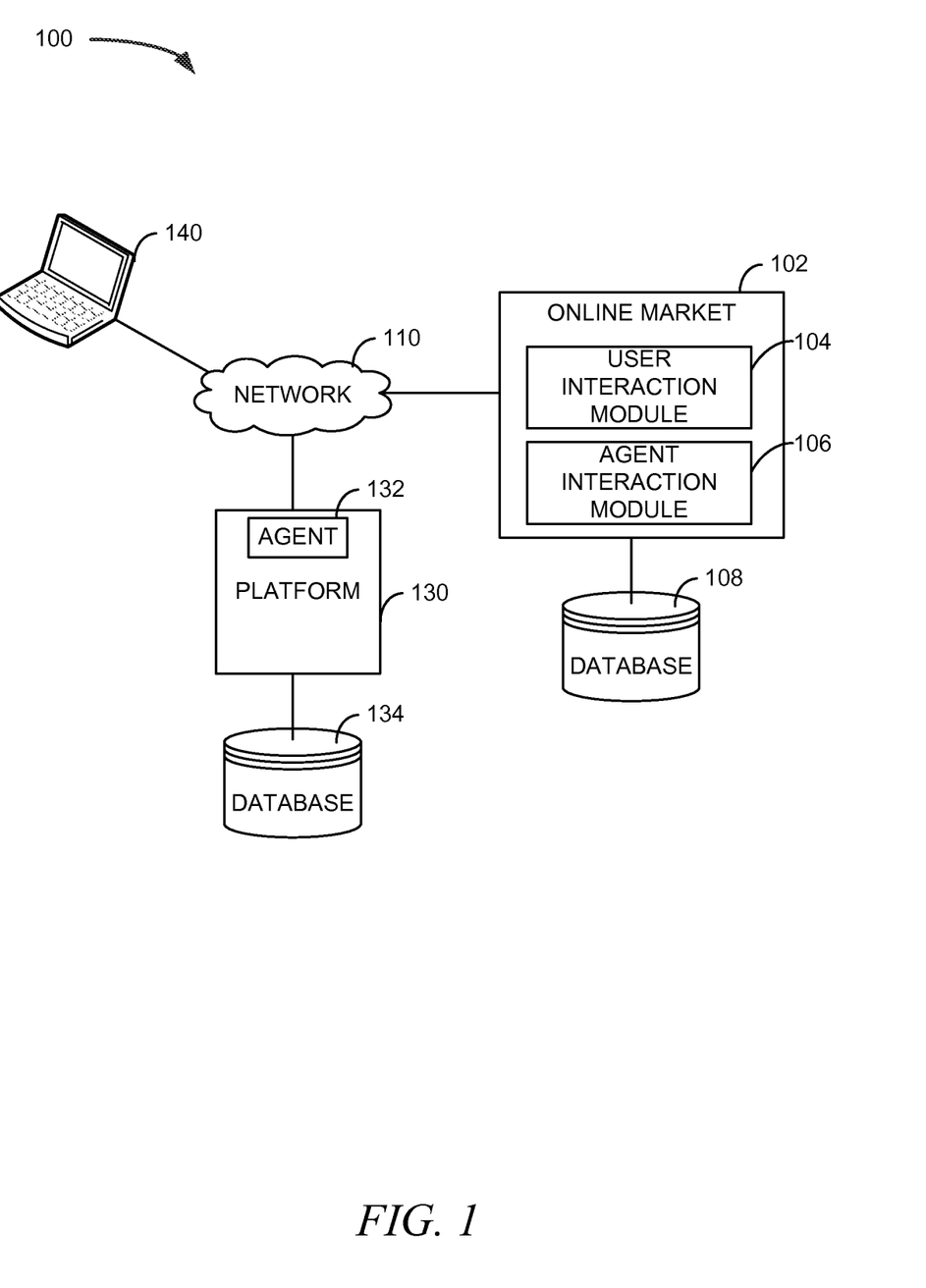
FIG. 1 is a logical block diagram of a system, according to an example embodiment.

FIG. 1 is a logical block diagram of a system 100, according to an example embodiment. The system 100 may include an online market 102. The online market 102 may include a user interaction module 104 that provides a user interface application, such as a web-based user interface, that allows a user to interact with the online market 102. The online market 102 may include a deployment template agent interaction module 106 that communicates through a network 110 with a deployment platform 130. The deployment platform 130 may be a hardware system or virtual machine. The deployment platform 130 may include a deployment template agent 132, and the deployment template agent interaction module 106 may communicate with the deployment template agent 132. The online market 102 may include or be connected to a market database 108, or the platform 130 may include or be connected to a platform database 134.

The system 100 may include a computer 140. The computer 140 may interact through a network 110 with the deployment platform 130 and the online market 102. The computer 110 may display the GUI provided by the user interaction module 104. Using the GUI, the user may cause an existing deployment template to be deployed from the online market 102 to the deployment platform 130. Various deployment templates may be available on the online market 102, and the deployment template agent 132 may communicate with the online market 102 to confirm the system is compatible with a deployment template. The deployment template agent 132 may confirm that the deployment platform 130 meets the minimum requirements for a basic deployment template, or may confirm that the system meets the minimum requirements for additional deployment templates selected by the user. The user may use the GUI application to select a deployment template from all existing deployment templates, and based on the deployment template selected, the deployment template agent may confirm that the deployment platform 130 meets the minimum requirements for the selected deployment template. If the selected deployment template is not compatible with the deployment platform 130, the user may be informed of the cause of the incompatibility (e.g., service pack level, minimum RAM requirements), and the user may select a different deployment platform or may pause deployment while he or she reconfigures the system to correct the cause of the incompatibility.

The deployment template agent 132 may examine the deployment platform 130, provide the deployment platform 130 information to the online market 102, and the online market 102 may indicate which deployment templates are compatible with the deployment platform 130. Additionally, the deployment template agent 132 may examine two or more deployment platforms, provide all of the information to the online market 102, and the online market 102 may indicate which deployment templates are compatible with each deployment platform. The online market 102 may provide additional information about the operating system or hardware specifications of each deployment platform. Using the additional deployment platform information, the user may select a deployment template that maximizes the efficiency of the deployment platform.

The deployment template agent 132 may perform various security tasks. The deployment template agent may communicate with the online market 102 to confirm the user has permission to deploy a deployment template on the deployment platform 130. For example, the user may enter a user ID (e.g., user name, user password), and the deployment template agent 130 or online market 102 may use the ID to determine which deployment templates are available to the user. If a portion of the deployment template is associated with a third-party provider, the ID may be provided to the third-party to confirm the user has permission to install or use the third-party deployment template portion. One or more system or application licenses may be associated with a user ID, and the deployment template agent 132 may transfer and activate licenses during or following deployment of the template deployment. The deployment template agent 132 may also confirm that the user is deploying the deployment template to a permissible location (e.g., a location not prohibited by export restrictions). For example, the deployment template agent 132 may provide the IP address of the deployment platform 130 or computer 140 or all IP addresses traversed through the network 110 using IP network packet routing diagnostic tools (e.g., traceroute). The deployment template agent 132 or the online market 102 may identify geographic locations associated with the one or more IP addresses, and may confirm that the deployment template is not being deployed to a prohibited location. The system 100 may test the location periodically to ensure the deployment template is not being deployed to a prohibited location. The deployment template agent 132 may be able to receive and execute an instruction to destroy at least a portion of the deployed template in response to a determination that the location of the deployment platform 130 or computer 140 may be unauthorized.

Prior to file transfer, the deployment template agent 132 may examine files on the deployment platform 130, and may prevent the transfer of any files already present on the deployment platform 130. Deployment template files may be transferred by a network using standard network transmission protocols (e.g., http, udp, tcp) or a vendor-specific transmission protocol. Deployment template files may be transferred by a peer-to-peer (P2P) file transfer protocol (e.g. BitTorrent). The deployment template agent 132 may generate and transmit one or more progress messages via the network 110, where each progress message contains data indicating the progress of the deployment of the template deployment.

Following deployment template file transfer, the user may be informed (e.g., via e-mail, SMS text message, or other message type) that the new deployment template has been successfully deployed. Also following deployment template file transfer, the deployment template files may be installed or otherwise configured on the deployment platform 130. For example, upon completion of the deployment template file transfer, user accounts may be generated automatically, or applications or system services may be registered or instantiated. The deployment template may also be tested automatically, where the automatic testing may include logging into the system using the provided user ID. The automatic testing may include a test that processes sample data or exercises the functionality of some or all of the installed applications. The user may be informed upon the completion of installation of deployment template files or system tests.

Figure 2:
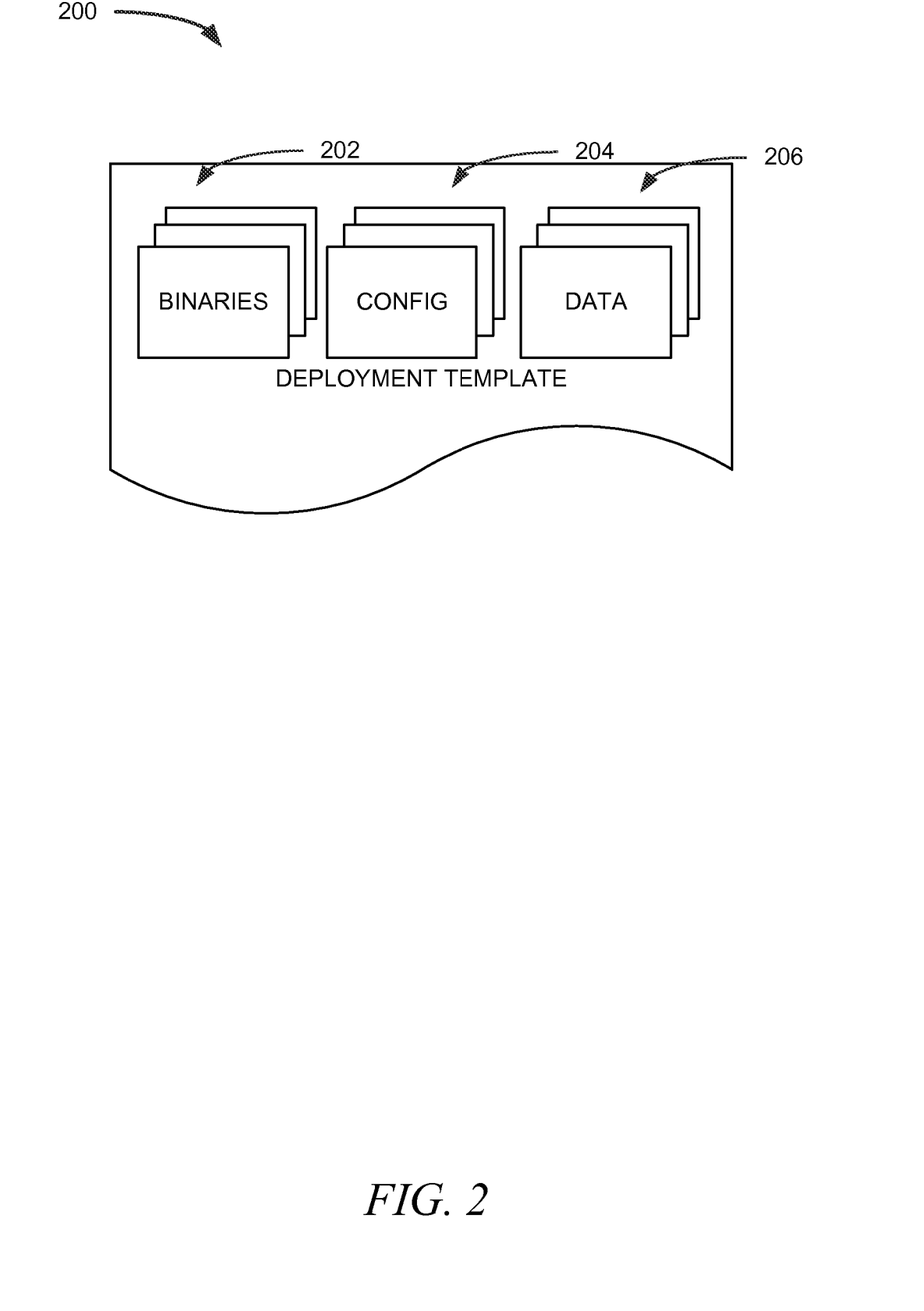
FIG. 2 is a logical block diagram of a deployment template, according to an example embodiment.

FIG. 2 is a logical block diagram of a deployment template 200, according to an example embodiment. The deployment template 200 may include binary files 202 (e.g., executable files), configuration files 204 storing configuration settings and additional content and deployment template add-ons, data files 206, and other such data. The binary files 202 are typically executable to perform specific tasks according to stored instructions. The binary files 202 may include machine code instructions written for a specific combination of processor and operating system. For example, the binary files may include a database management GUI written for an x86 processor running Microsoft Windows 2003. The binary files 202 may operate based on parameters defined in the configuration files 204, and may read from or write to the data files 206 during operation. For example, database management GUI binary files 202 may configure the GUI environment according to data read from configuration files 204, and may read and write to database data files 206. The file configuration of the deployment template may vary from application to application and from embodiment to embodiment.

Figure 3:
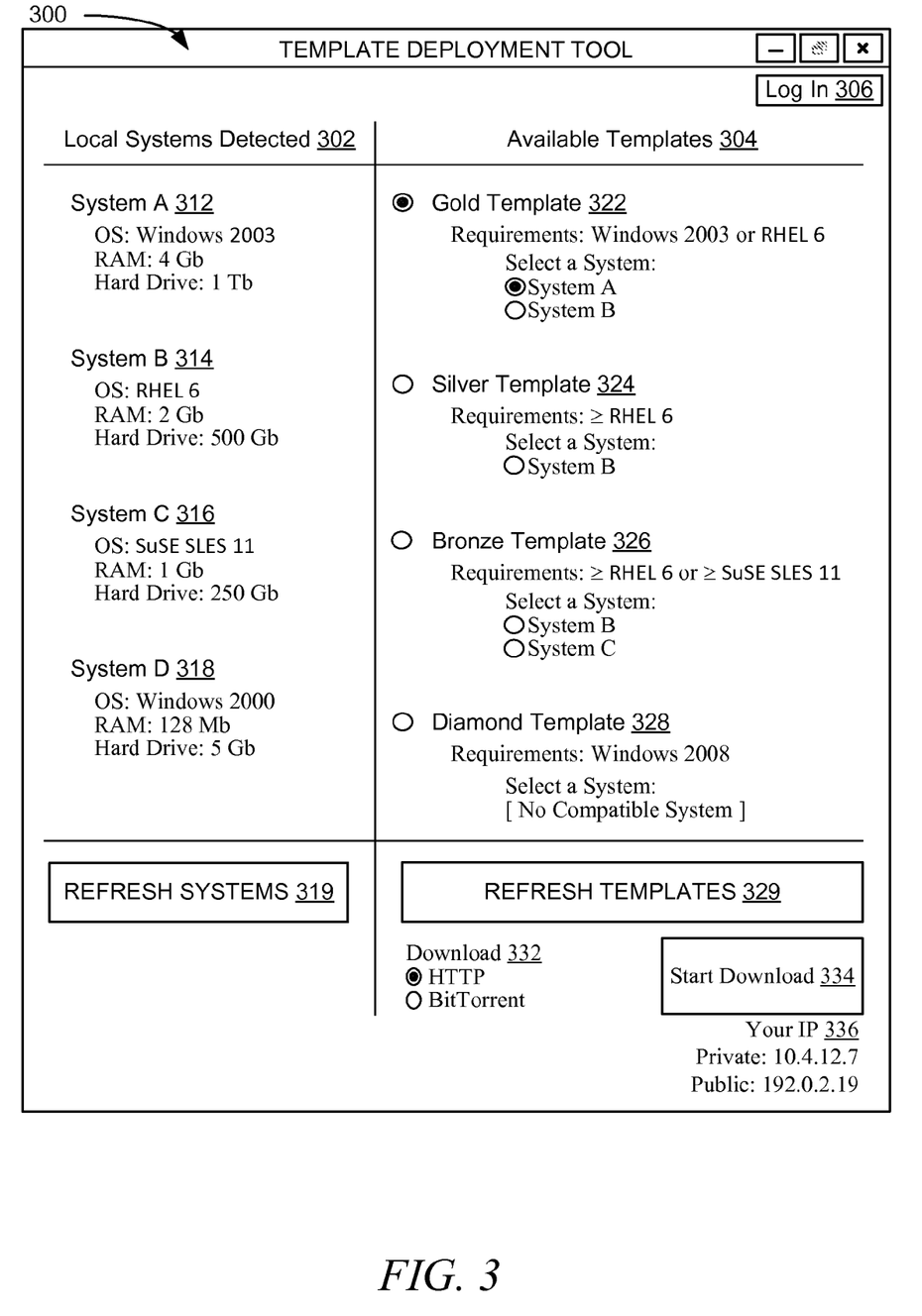
FIG. 3 is a generic user interface (GUI), according to an example embodiment.

FIG. 3 is a generic user interface (GUI) 300, according to an example embodiment. As discussed above, the GUI 300 may enable a user to cause an existing deployment template to be deployed from an online market to a deployment platform. The GUI 300 may include a list of local systems detected 302 and a list of available templates 304. The GUI may include a Log In 306, where a user can enter a username and password. The username and password may be used to determine which templates a user may access.

The local systems detected 302 may include a list of one or more deployment platforms. For example, local systems detected 302 may include a Windows 2003 System A 312, an Redhat RHEL 6 System B 314, an SuSE SLES 11 System C 316, or a Windows 2000 System D. Information about the deployment platforms may be collected by the deployment template agent and provided to the online market to determine compatibility. The list of local systems detected 302 may be refreshed using a refresh systems button 319. The list of available templates 304 may include a list of all available templates, or may include a subset of a list of all available templates. The subset of available templates may be selected based on templates associated with a username and password, based on compatible local systems detected, or one or more other factors. For example, the subset of available templates may include a Gold Template 322, a Silver Template 324, a Bronze Template 326, or a Platinum Template 328. The list of available templates 304 may be refreshed using a refresh templates button 329.

Using deployment platform information provided by the template agent to the online market, each template may list its minimum requirements or indicate which deployment templates are compatible with the deployment platform 130. For example, Gold Template 322 may require Windows 2003 or Redhat RHEL 6, and may indicate that the user may choose between System A 312 and System B 314. Using the additional deployment platform information, the user may select a deployment template that maximizes the efficiency of the deployment platform. For example, if Gold Template 322 is compatible with System A 312 and System B 314 but Silver Template 324 is only compatible with System B, then the user may choose to deploy the Gold Template 322 on System A 312 and deploy the Silver Template 324 on System B 314. A template may indicate if it is not compatible with any available deployment platforms. For example, if Diamond Template 328 requires Windows 2008, Diamond Template 328 may indicate that no compatible deployment platform is available. If a deployment template is not compatible with any deployment platform 130, the user may be informed of the cause of the incompatibility (e.g., service pack level, minimum RAM requirements), and the user may select a different deployment platform or may pause deployment while he or she reconfigures the system to correct the cause of the incompatibility.

Once a user has selected a template 304 and a deployment platform 302, the user may then select a download method 332. For example, the user may select a direct HTTP download, or the user may select a peer-to-peer (P2P) download (e.g., BitTorrent). After selecting a download method 332, the user may initiate the download 334. When the download has been initiated, the online market may perform various security tasks. The online market may confirm the user has permission to deploy a deployment template on the deployment platform. In an example, the online market may verify the user associated with the username and password has permission to deploy the selected template. The online market may confirm that the user is deploying the deployment template to a permissible location For example, the deployment template agent may provide the IP address of the deployment platform or computer, and the GUI 300 may display the public and private IP addresses 336. The deployment template agent or online market may identify geographic locations associated with the one or more IP addresses, and may confirm that the deployment template is not being deployed to a prohibited location.

Figure 4:
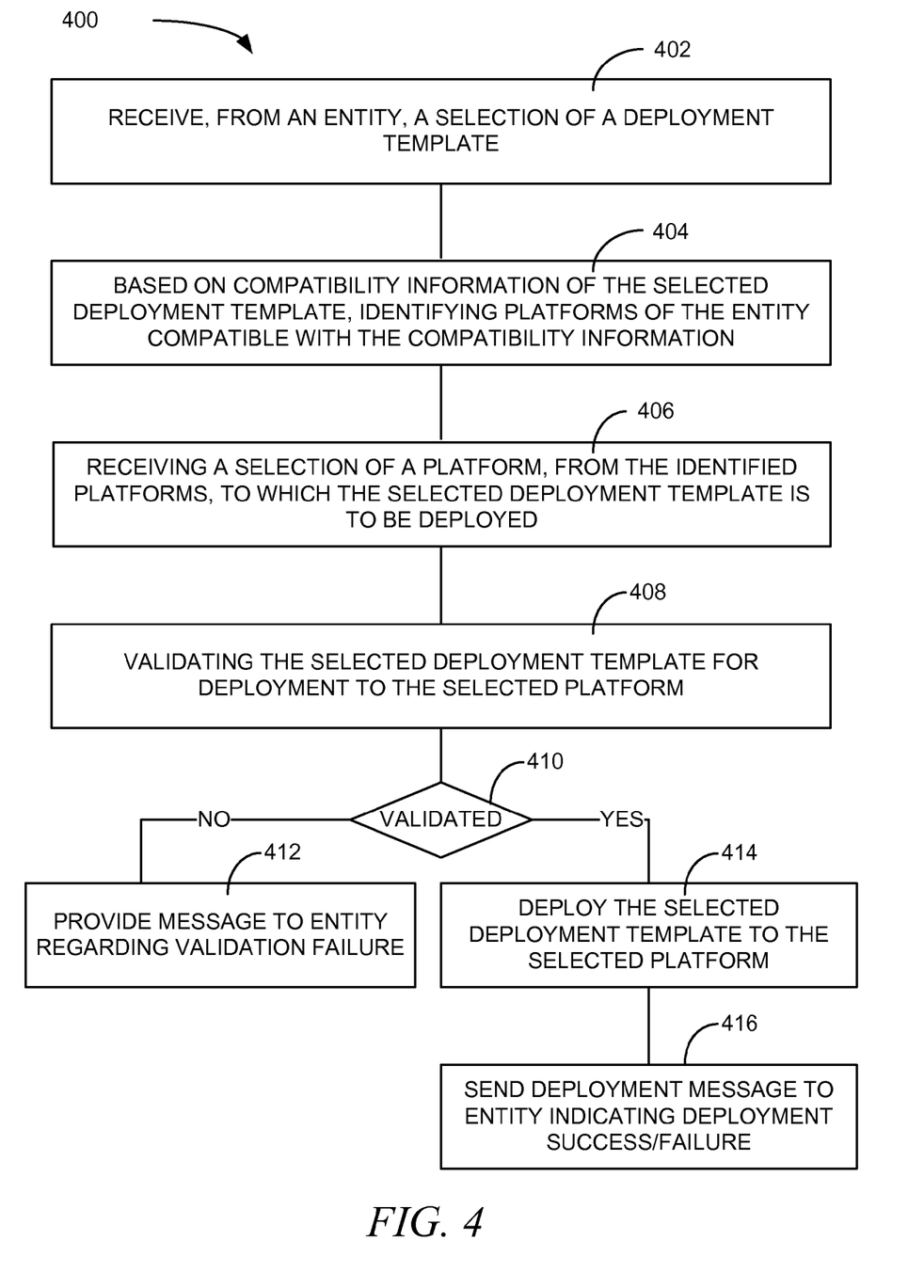
FIG. 4 is a logical block diagram of a template deployment method, according to an example embodiment.

FIG. 4 is a logical block diagram of a deployment template method 400, according to an example embodiment. The deployment template method 400 may receive 402 a selection of a deployment template. Selection of a deployment template may be received 402 in response to providing a web page, where the web page includes a listing of available deployment templates. The web page may be generated based on data representative of available deployment templates retrieved from a deployment template database. Each deployment template may have associated compatibility information, where the compatibility information requirements indicate minimum specification requirements for platforms on which the deployment template may be deployed. For example, a deployment template may require Microsoft Windows 2008 or newer Microsoft Windows operating systems, and therefore be incompatible with Microsoft Windows 2003 and older Microsoft Windows operating systems.

Using compatibility information of the selected deployment template, the deployment template method 400 may identify 404 platforms that are compatible with the compatibility information. Identifying 504 platforms of the entity compatible may include retrieving, from the deployment template database, compatibility information for the selected deployment template. The retrieved compatibility information may be used to identify compatible entity platforms to which the selected deployment template can be deployed. Identifying compatible entity platforms may include retrieving platform property data. The platform property data may be retrieved from a platform property database using a platform property data identifier. Identifying compatible entity platforms may also include comparing the retrieved compatibility information of the selected deployment template with the retrieved data identifying properties of the entity platforms.

The deployment template method 400 may receive 406 selection of one of the identified platforms where the selected deployment template is to be deployed. The selection may be received in response to generating and providing the listing of identified platforms to which the selected deployment template can be deployed.

The deployment template method 400 may validate 408 the selected deployment template for deployment to the selected platform. Validation 408 may include transmitting a validation data request to an agent that executes on the selected platform to obtain validation data related to at least one validation rule. Validation rules may include determining whether the user has permission to deploy the selected deployment template on the selected deployment platform. For example, the user may enter a user ID (e.g., user name, user password), and validation 408 may use the ID to determine which deployment templates are available to the user. If a portion of the deployment template is associated with a third-party provider, the ID may be provided to the third-party to confirm the user has permission to install or use the third-party deployment template portion. Validation rules may also confirm that the user is deploying the deployment template to a permissible location (e.g., a location not prohibited by export restrictions). For example, validation 408 may identify geographic locations associated with the one or more IP addresses associated with the entity, and may confirm that the deployment template is not being deployed to a prohibited location.

Following application of validation rules, validation 408 may include the agent receiving validation data in response to the validation data request, and applying the at least one validation rule to the received validation data to determine validation success or failure. If the selected deployment is not validated 410, the deployment template method 400 may provide 412 a message to entity regarding validation failure. If the selected deployment is validated 410, the deployment template method 400 may deploy 414 the selected deployment template to the selected platform. Deployment 414 may include transmitting the selected deployment template to an agent that executes on the selected platform. Upon receiving the selected deployment template, the agent may instantiate the deployment template on the selected platform. Following deployment, the deployment template method 400 may send 416 a deployment message to the entity indicating deployment success or failure.

Figure 5:
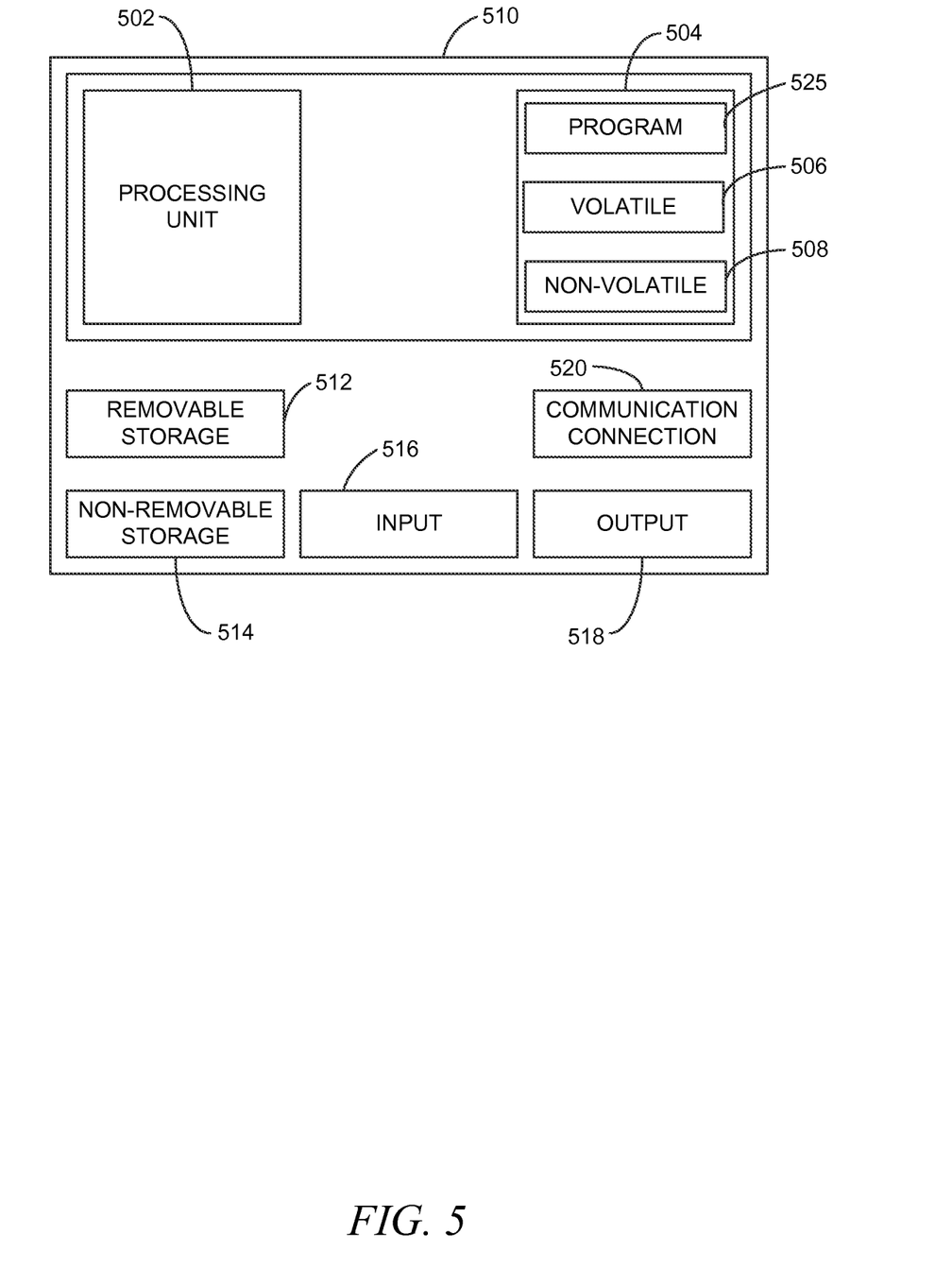
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, or other computing device including the same or similar elements as illustrated and described with regard to FIG. 5. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The input 516 may include one or more of a touchscreen, touchpad, mouse, keyboard, camera, and other input devices. The computer may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

In some embodiments, the non-removable storage 514 stores an operating system that maintains one or more virtual machines on the computer 510. Inside at least one of those virtual machines, which in some embodiments herein may be a form of a platform such as platform 132 of FIG. 1, the program 525 executes, such as a program of a deployment template agent 132, also of FIG. 1.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computer implemented method comprising:
receiving, from an entity via a network, a selection of a deployment template;
based on compatibility information of the selected deployment template, identifying platforms of the entity compatible with the compatibility information, the identifying including:
retrieving, from a deployment template database, compatibility information of each of at least one version of the selected deployment template; and
based on the retrieved compatibility information, identifying compatible entity platforms to which at least one version of the selected deployment template can be deployed;
receiving a selection of a platform, from the identified platforms, to which the selected deployment template is to be deployed, the selection received in response to generating and providing a web page including a listing of the identified compatible entity platforms to which at least one version of the selected deployment template can be deployed;

validating the selected deployment template for deployment to the selected platform; and when the selected deployment template is successfully validated for deployment to the selected platform, deploying the selected deployment template to the selected platform.

2. The computer implemented method of claim 1, wherein validating the selected deployment template for deployment to the selected platform includes:

transmitting a validation data request to an agent that executes on the selected platform to obtain validation data related to at least one validation rule;

receiving validation data in response to the validation data request; and applying the at least one validation rule to the received validation data to determine validation success or failure.

3. The computer implemented method of claim 2, wherein:

the validation data request includes a request for data identifying a location of the selected platform or data from which a location of the selected platform can be determined; and the at least one validation rule includes a validation rule to determine whether the selected deployment template can be deployed to the location of the platform in view of legal export restrictions.

4. The computer implemented method of claim 1, wherein deploying the selected deployment template includes:

transmitting the selected deployment template to an agent that executes on the selected platform, the deployment template including binaries, configuration files, and data files, to cause the agent to instantiate the deployment template on the selected platform.

5. The computer implemented method of claim 1, wherein the selection of the deployment template is received in response to providing a web page including a listing of available deployment templates, the web page generated based on data representative of available deployment templates retrieved from the deployment template database.

6. The computer implemented method of claim 1, wherein identifying compatible entity platforms to which at least one version of the selected deployment template can be deployed includes:

retrieving, based on an identifier of the entity from a database storing data representative of entity platforms, data identifying properties of the entity platforms; and comparing the retrieved compatibility information of each of the at least one version of the selected deployment template with the retrieved data identifying properties of the entity platforms to identify any entity platforms compatible with the selected deployment template.

7. A non-transitory computer-readable medium, with instructions stored thereon which when executed by at least one processor of at least one computing device, cause the at least one computing device to:

receive, from an entity via a network, a selection of a deployment template;

based on compatibility information of the selected deployment template, identify platforms of the entity compatible with the compatibility information, the identifying including:

retrieving, from a deployment template database, compatibility information of each of at least one version of the selected deployment template; and based on the retrieved compatibility information, identifying compatible entity platforms to which at least one version of the selected deployment template can be deployed;

receive a selection of a platform, from the identified platforms, to which the selected deployment template is to be deployed, the selection received in response to generating and providing a web page including a listing of the identified compatible entity platforms to which at least one version of the selected deployment template can be deployed;

validate the selected deployment template for deployment to the selected platform; and when the selected deployment template is successfully validated for deployment to the selected platform, deploy the selected deployment template to the selected platform.

8. The non-transitory computer-readable medium of claim 7, wherein validating the selected deployment template for deployment to the selected platform includes:

transmitting a validation data request to an agent that executes on the selected platform to obtain validation data related to at least one validation rule;

receiving validation data in response to the validation data request; and applying the at least one validation rule to the received validation data to determine validation success or failure.

9. The non-transitory computer-readable medium of claim 8, wherein:

the validation data request includes a request for software license related data with regard to a software product; and the at least one validation rule includes a validation rule to determine whether one or both of the platform and the entity hold a valid license for the software product.

10. The non-transitory computer-readable medium of claim 7, wherein deploying the selected deployment template includes:

transmitting the selected deployment template to an agent that executes on the selected platform, the deployment template including binaries, configuration files, and data files, to cause the agent to instantiate the deployment template on the selected platform.

11. The non-transitory computer-readable medium of claim 7, wherein upon deployment completion, execution of the instructions further causes the at least one computing device to:

receive an indication from the selected platform indicating deployment is complete; and generate and transmit a message to the entity indicating deployment completion.

12. The non-transitory computer-readable medium of claim 7, wherein identifying compatible entity platforms to which at least one version of the selected deployment template can be deployed includes:

retrieving, based on an identifier of the entity from a database storing data representative of entity platforms, data identifying properties of the entity platforms; and comparing the retrieved compatibility information of each of the at least one version of the selected deployment template with the retrieved data identifying properties of the entity platforms to identify any entity platforms compatible with the selected deployment template.

* * * * *